(12) United States Patent
Mermoud et al.

(10) Patent No.: US 11,979,298 B1
(45) Date of Patent: May 7, 2024

(54) ROBUST TRAINING OF APPLICATION QOE PREDICTION MODELS

(71) Applicant: Cisco Technology, Inc., San Jose, CA (US)

(72) Inventors: Grégory Mermoud, Venthône (CH); Jean-Philippe Vasseur, Combloux (FR); Romain Kakko-Chiloff, Paris (FR); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/209,803

(22) Filed: Jun. 14, 2023

(51) Int. Cl.
| | |
|---|---|
| *G06F 16/9035* | (2019.01) |
| *G06F 16/28* | (2019.01) |
| *H04L 41/16* | (2022.01) |
| *H04L 41/5009* | (2022.01) |
| *H04L 51/02* | (2022.01) |

(52) U.S. Cl.
CPC .......... *H04L 41/5009* (2013.01); *H04L 41/16* (2013.01); *H04L 51/02* (2013.01)

(58) Field of Classification Search
CPC ..... H04L 41/5009; H04L 41/16; H04L 51/02; G06K 9/62; G06K 9/6219
USPC ........................................................ 709/224
See application file for complete search history.

(56) References Cited

U.S. PATENT DOCUMENTS

| | | | |
|---|---|---|---|
| 9,203,764 B2 | 12/2015 | Shirazipour et al. | |
| 11,257,002 B2 | 2/2022 | Faulhaber, Jr. et al. | |
| 2020/0203012 A1* | 6/2020 | Kamath | G16H 40/67 |
| 2022/0188563 A1* | 6/2022 | Baughman | G06F 18/231 |
| 2022/0245511 A1 | 8/2022 | Perian et al. | |
| 2022/0273204 A1* | 9/2022 | Kamath | G06F 11/1004 |
| 2022/0400065 A1 | 12/2022 | Cioffi et al. | |

FOREIGN PATENT DOCUMENTS

WO     2022029465 A1    2/2022

* cited by examiner

*Primary Examiner* — Jude Jean Gilles
(74) *Attorney, Agent, or Firm* — BEHMKE INNOVATION GROUP LLC; James M. Behmke; James J. Wong

(57) ABSTRACT

In one embodiment, a device trains, using feedback from a reference cohort of users of an online application, a prediction model to predict a quality of experience metric for the online application based on network telemetry. The device uses the prediction model to predict quality of experience metrics for different cohorts of users of the online application. The device makes one or more comparisons between performance metrics for the prediction model for the different cohorts of users, based on the quality of experience metrics predicted for the different cohorts of users. The device retrains, based on the one or more comparisons, the prediction model using feedback from the reference cohort and a particular cohort from among the different cohorts of users.

20 Claims, 12 Drawing Sheets

ROBUST TRAINING OF APPLICATION QOE PREDICTION MODELS

TECHNICAL FIELD

The present disclosure relates generally to computer networks, and, more particularly, to the robust training of application quality of experience (QoE) prediction models.

BACKGROUND

With the recent evolution of machine learning, predictive failure detection and proactive routing in a network now becomes possible through the use of machine learning techniques. For instance, modeling the delay, jitter, packet loss, etc. for a network path can be used to predict when that path will violate the service level agreement (SLA) of the application and reroute the traffic, in advance. Recently, more complex models are able to predict the quality of experience (QoE) of an online application using feedback from the users of the application, instead of relying on SLA violations as a proxy for the QoE.

Of course, the performance of a QoE prediction model is largely dependent on the body of training data that is available. In the context of relying on real user feedback to train the QoE prediction model, though, it is impractical to ask all application users for feedback at a high frequency, as doing so is likely to annoy those users and potentially even impact their experiences, as well. Randomly selecting users to ask for feedback could help to alleviate some of these concerns, but also runs the risk of producing a training dataset that is not informative enough to result in a QoE prediction model that provides acceptable performance (e.g., by missing valuable feedback during a networking issue, etc.). In addition, the choice of users to query can also have an impact on the performance of the resulting model (e.g., different users may experience different network phenomena, some users may provide more thoughtful feedback than others, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
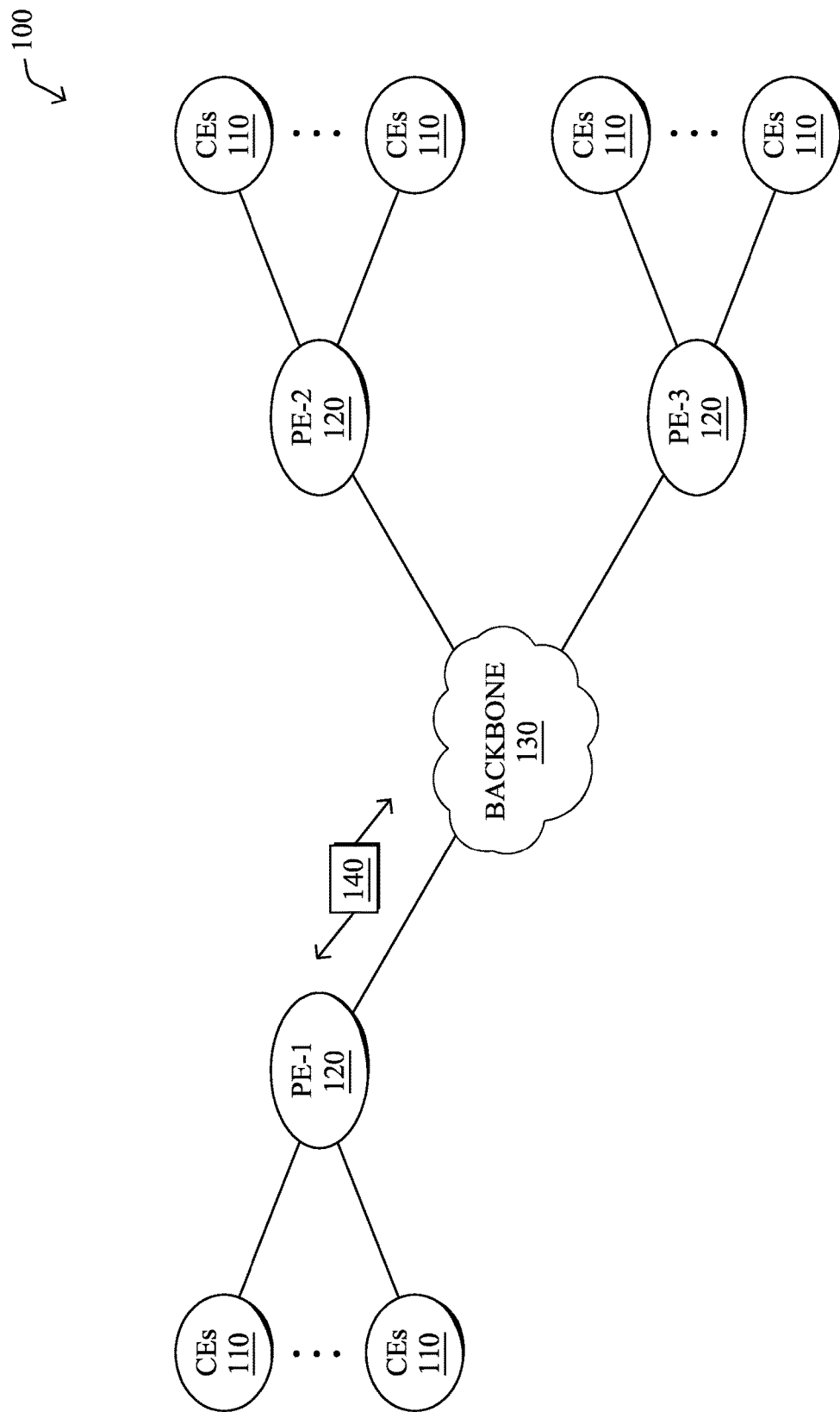
FIGS. 1A-1B illustrate an example communication network.

According to one or more embodiments of the disclosure, a device trains, using feedback from a reference cohort of users of an online application, a prediction model to predict a quality of experience metric for the online application based on network telemetry. The device uses the prediction model to predict quality of experience metrics for different cohorts of users of the online application. The device makes one or more comparisons between performance metrics for the prediction model for the different cohorts of users, based on the quality of experience metrics predicted for the different cohorts of users. The device retrains, based on the one or more comparisons, the prediction model using feedback from the reference cohort and a particular cohort from among the different cohorts of users.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B 1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
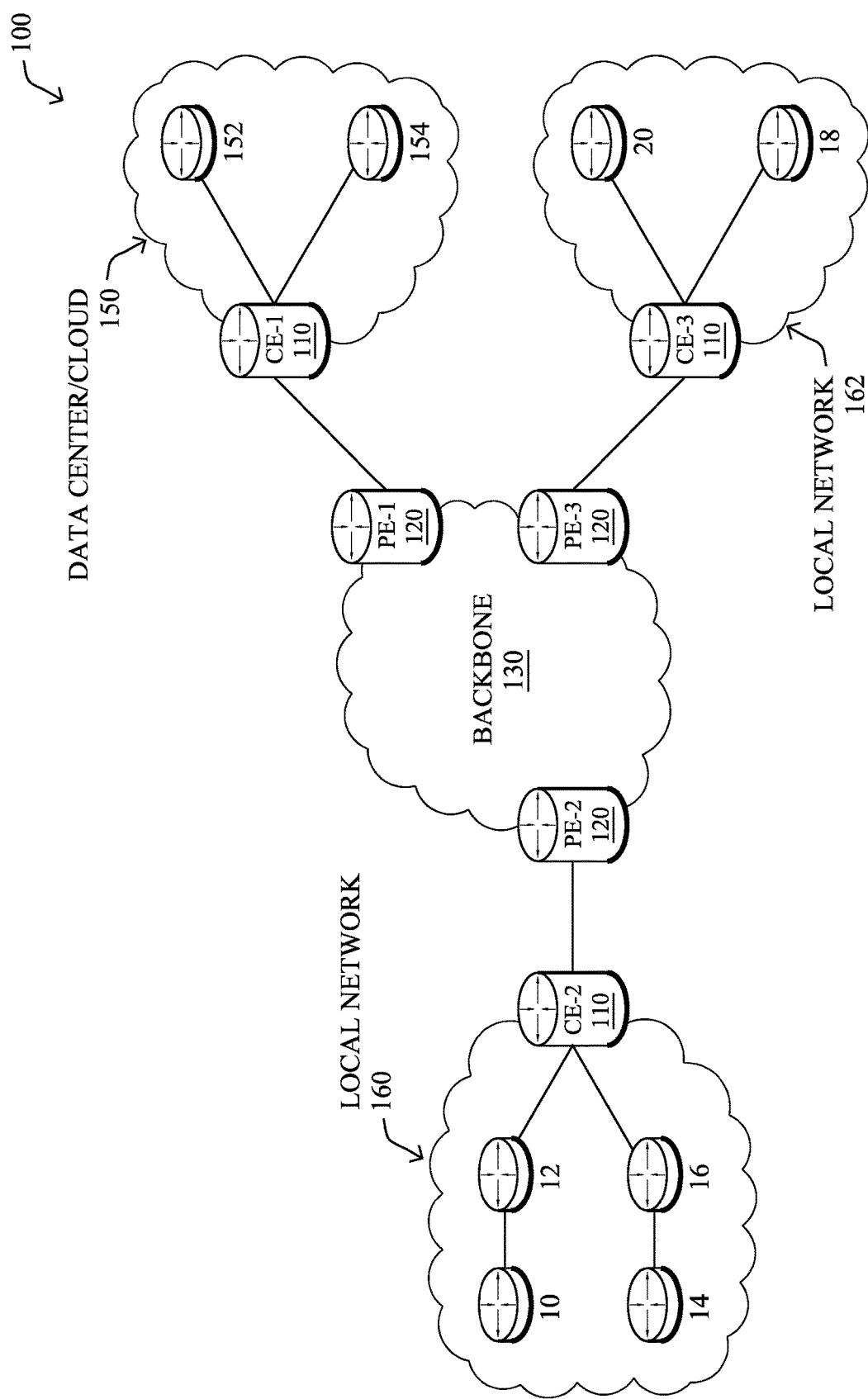

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
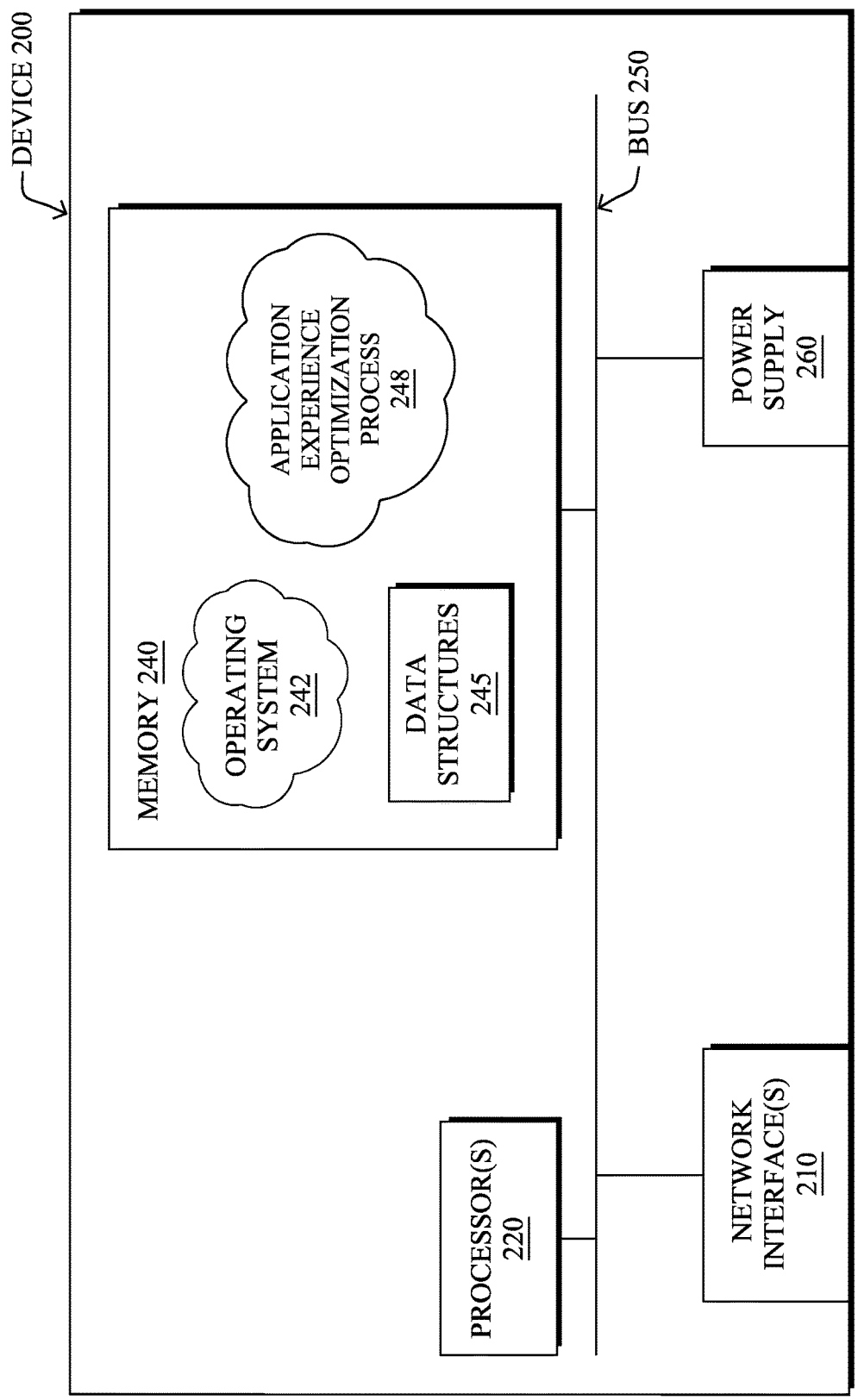
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
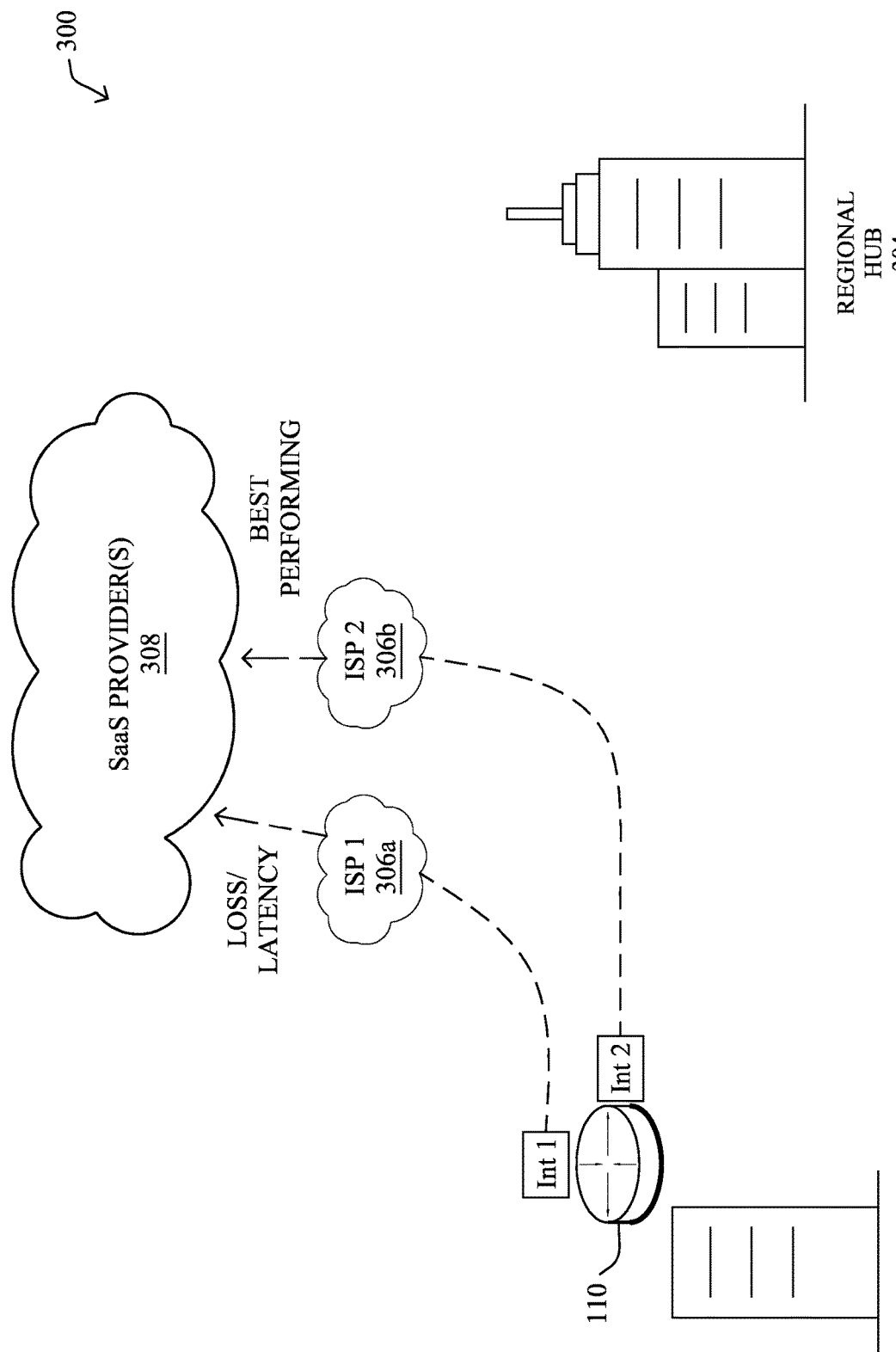
FIGS. 3A-3B illustrate example network deployments.
Figure 3B:
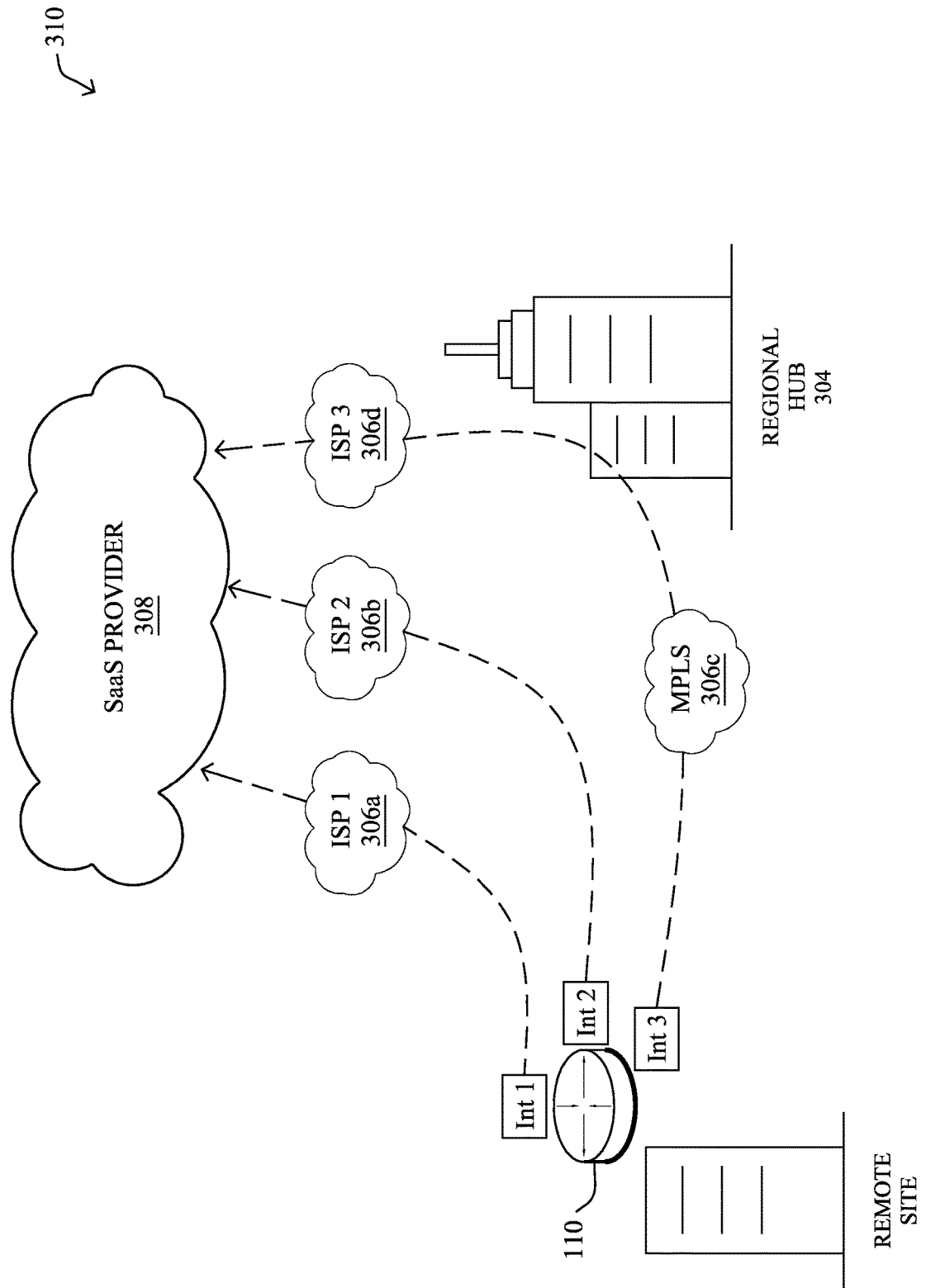

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
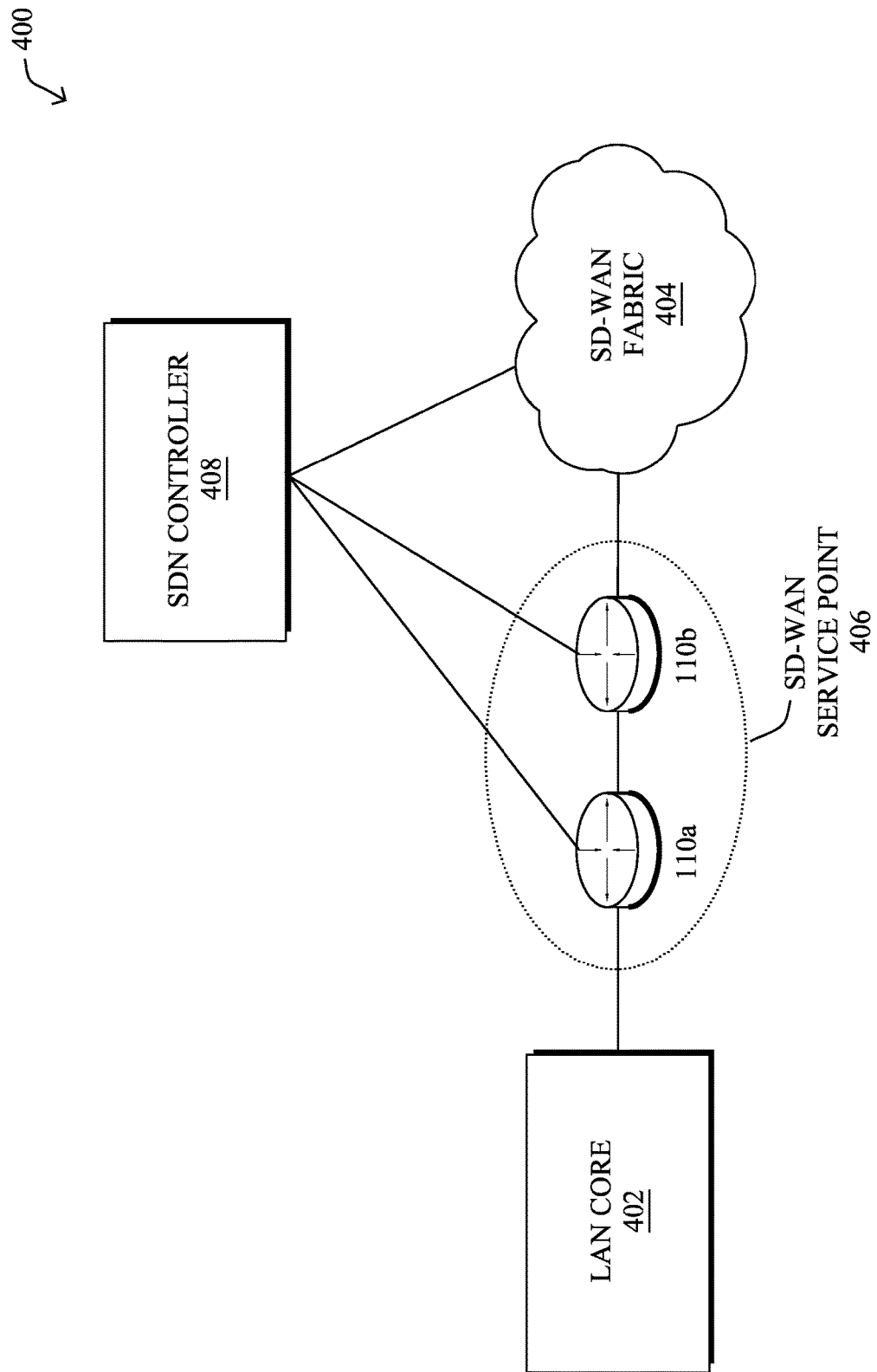
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-11.0b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (Si's) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to route traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
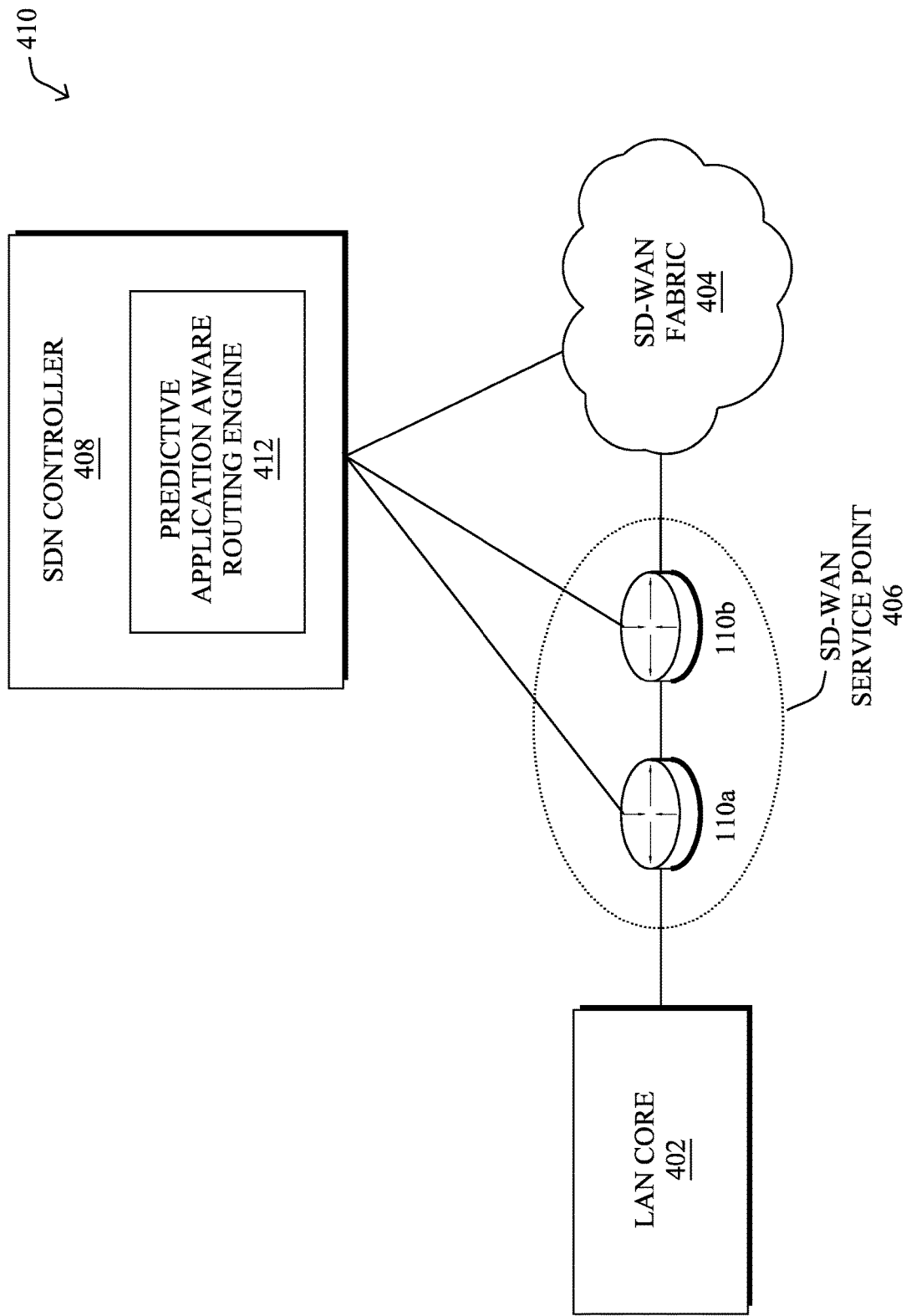

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same dine, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport layer e.g., the layer at which TCP or UDP
5. The Session Layer—e.g., the layer at which a given session between endpoints is managed
6. The Presentation layer e.g., the layer that translates requests from the application layer to the session layer and vice-versa
7. The Application Layer—the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, predictive and cognitive networks are now possible by leveraging user feedback to train a QoE prediction model for an online application that drives decisions in the network. For instance, such feedback may be provided within the application itself via a pop-up survey, via a chatbot, or the like. As would be appreciated, collecting meaningful datasets for training a QoE prediction model typically requires many such users to participate in the feedback collection mechanism, to ensure acceptable performance by the prediction model. Convincing users to participate in such efforts, though, can be challenging and require education to make users aware of the benefits of providing QoE feedback, to improve the overall enterprise user experience.

In addition, when bootstrapping a QoE model and data collection for a new application, initial estimates of the QoE by the prediction model may be poor until sufficient training data is collected. However, such training data can usually only be collected based on such initial estimates to start with, as random sampling without any guiding model can lead to datasets that are not informative enough for QoE modeling. As the system begins to collect this user feedback, it can then train slightly better performing models which, in turn, can help to better focus in on interesting situations and collect more informative user feedback.

Finally, QoE modeling can include unsupervised or self-supervised pre-training phases, where application-specific representations are learned from a large body of application telemetry and related data. Unlike when dealing with labeled datasets which are bound to be limited in size, scale issues can arise when performing such pre-training, and considering a subset of the overall dataset may be required. Although various forms of random sampling can be used, it can make sense as well to segment users by group and subsample based on that.

In that context, it makes sense to progressively onboard users of an enterprise in waves or groups, also referred to herein as 'cohorts.' For example, a cohort of users in a location known to be problematic for the target application can be onboarded first, as it might provide the most informative early feedback. On the other hand, such a group may also be subject to highly specific issues (e.g., due to specific location-based factors) that may not generalize to other cohorts. Additionally, a group of users may be more trustworthy because they have received a detailed briefing on the procedure or are incentivized in some way, while other groups may provide feedback much less carefully. In that situation, it can be preferable to start with a trusted cohort for model training, first.

Although prediction models can, to some extent, deal with such variability through feature engineering and regularization, including certain cohorts can cause issues with training and inference, especially as samples are always limited when collecting direct user feedback, which can make models more prone to over-fitting. In other words, which users are selected to provide feedback for model training, as well as when, can greatly influence the performance of the resulting prediction model.

Robust Training of Application QoE Prediction Models

The techniques herein provide for the robust training of application QoE prediction models by assessing the potential cost of adding new cohorts of users to the QoE modeling process, starting from a trusted reference cohort, and in a decision analysis fashion, providing metrics that can be used by an operator to decide which cohorts to integrate, as well as tools to build those dynamically.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device trains, using feedback from a reference cohort of users of an online application, a prediction model to predict a quality of experience metric for the online application based on network telemetry. The device uses the prediction model to predict quality of experience metrics for different cohorts of users of the online application. The device makes one or more comparisons between performance metrics for the prediction model for the different cohorts of users, based on the quality of experience metrics predicted for the different cohorts of users. The device retrains, based on the one or more comparisons, the prediction model using feedback from the reference cohort and a particular cohort from among the different cohorts of users.

Figure 5:
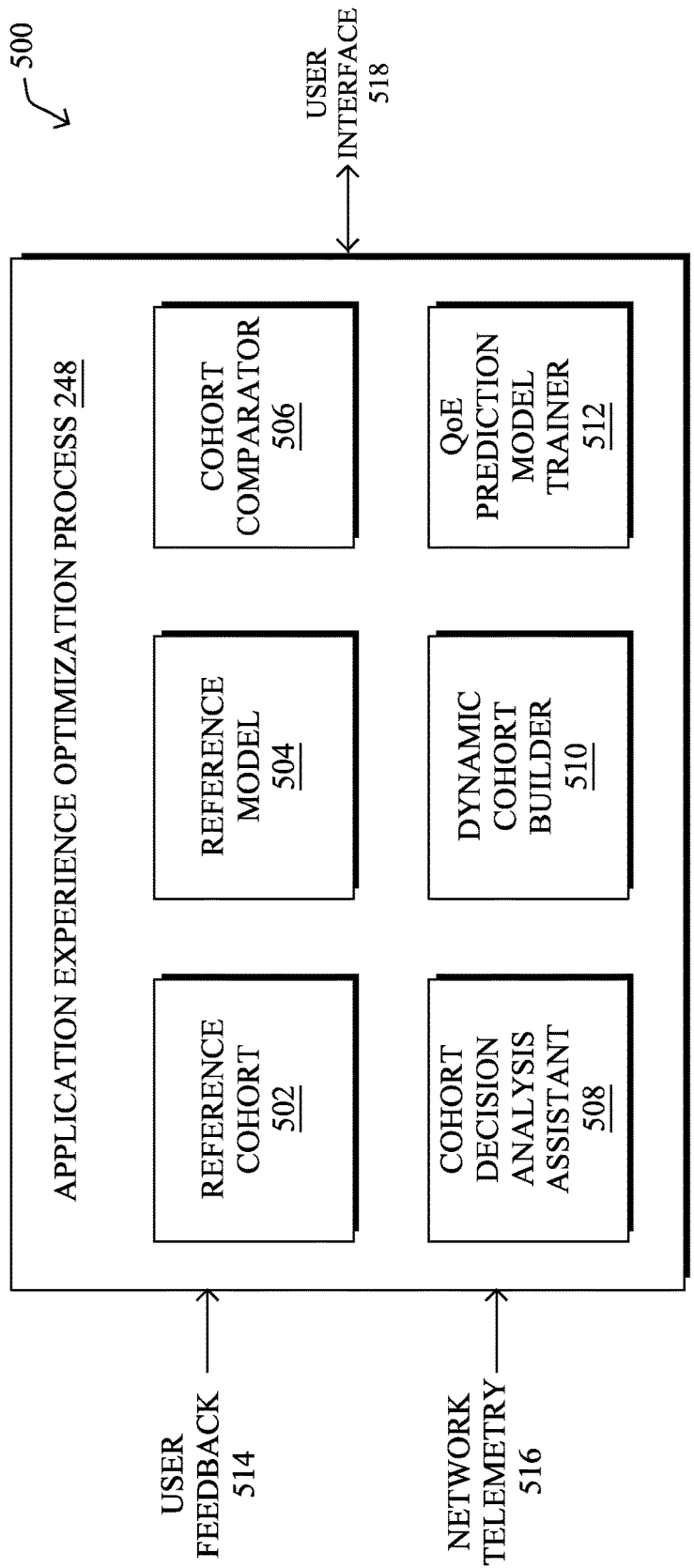
FIG. 5 illustrates an example architecture for the robust training of application quality of experience (QoE) prediction models.

Operationally, FIG. 5 illustrates an example architecture for the robust training of application quality of experience (QoE) prediction models, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, a firewall, etc.), another device or service in communication therewith, or the like.

As shown, application experience optimization process 248 may include any or all of the following components: reference cohort 502, reference model 504, cohort comparator 506, cohort decision analysis assistant 508, dynamic cohort builder 510, and/or QoE prediction model trainer 512. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

As shown, application experience optimization process 248 may rely on user feedback 514 collected internally by an online application or externally (e.g., via a chatbot, user surveys sent via a different mechanism, support ticket, etc.), which application experience optimization process 248 may obtain either on a pull or push basis. For instance, user feedback 514 may be based on user ratings regarding their satisfaction with their application experiences, such as on a scale of 0-5, 0-10, etc.

In addition, application experience optimization process 248 may also obtain network telemetry 516 associated with user feedback 514. For instance, network telemetry 516 may include path performance metrics (e.g., delay, loss, jitter, etc.), the type of access used by the clients of the application (e.g., cellular, ADSL, etc.), the location of the clients, routing information, or any other information regarding the network used to access the online application.

According to various embodiments, application experience optimization process 248 may begin by selecting reference cohort 502 among the users of the online application. For instance, an administrator may specify via user interface 518 the set of users that are considered trustworthy or high-quality user feedback 514. In other instances, application experience optimization process 248 may select reference cohort 502, automatically. For example, such a selection (either manual or automated) may be based on criteria such as whether those users have undergone online training to provide QoE feedback with care, whether they are to receive some incentive for providing user feedback 514 regarding the application, whether they are relevant subject matter experts, whether they have the right field of experience, or the like.

In various embodiments, user feedback 514 for any given cohort of users, including reference cohort 502, may include either or both of the following types of feedback:

Solicited feedback—such feedback may be captured by proactively asking users to rate their current or recent application experiences (e.g., via a chatbot, pop-up, etc.).

Unsolicited feedback—such feedback may be captured via a mechanism that allows users to report situations of good or poor QoE as they see fit (e.g., through a dedicated support application, by sending a message to a chatbot, etc.).

In that context, user feedback 514 for reference cohort 502 may preferably comprise unsolicited feedback from those users, as unsolicited feedback can be more valuable and of higher quality in general than solicited feedback which relies on automated mechanisms to decide when to poll a user for feedback. Moreover, matching unsolicited feedback within user feedback 514 to the appropriate network telemetry 516 is also less complicated as it reflects an instantaneous view of the QoE from the user while solicited feedback highly depends on the moment when it is received and the moment when it is answered. In turn, QoE prediction model trainer 512 may train and evaluate QoE models using either solicited feedback only, or on both solicited and unsolicited feedback (possibly weighted differently to account for their differing nature and importance).

In another embodiment, application experience optimization process 248 may simply remain agnostic as to the types(s) of feedback within user feedback 514 (e.g., if certain types of feedback are not available from certain users).

In various embodiments, QoE prediction model trainer 512 may train reference model 504 using the user feedback 514 and network telemetry 516 associated with reference cohort 502. In general, reference model 504 may take the form of a prediction model that is able to predict a QoE metric for the online application, given a set of network telemetry. Any model suitable to QoE modeling can be used here, and classical techniques such as cross-validation can be used to adjust potential hyper-parameters, as long as only data from the reference cohort is being used.

In one embodiment, QoE prediction model trainer 512 may train reference model 504 using only a part of the data associated with reference cohort 502, keeping the remainder for further comparisons with additional cohorts. In this instance, application experience optimization process 248 may employ a data splitting strategy to avoid data leakage (e.g., stratify by user). Note that training reference model 504 using high quality training data is of utmost importance and QoE prediction model trainer 512 may even request manual evaluation of the data by an administrator via user interface 518 or automated evaluation. For instance, the administrator or application experience optimization process 248 itself may contact those users to ensure that the captured user feedback 514 truly reflected their experiences, etc.

During execution, cohort comparator 506 may be configured to compare the performance of reference model 504 with respect to different cohorts of users. For instance, given two potential cohorts as input, referred to as cohort A and cohort B, the cohort comparator 506 may be responsible for outputting statistical scores capturing differences in performance when predicting the application's QoE using reference model 504 on each cohort. For instance, these scores may reflect the prediction error and accuracy of reference model 504 over cohorts A and B. As the cohorts could vary in their nature (e.g., different proportions of solicited vs unsolicited feedback or different proportions of positive vs negative feedback), the statistical scores may be selected accordingly to counteract the natural unbalance of the cohorts. From these scores, cohort comparator 506 may then compare the distributions for each cohort and assess whether they are statistically relevant. Cohort comparator 506 may also leverage a statistical test, to validate the difference between the two cohorts.

In other words, QoE prediction model trainer 512 may train reference model 504 using user feedback 514 and network telemetry 516 associated with reference cohort 502. In turn, cohort comparator 506 may use network telemetry 516 as input to reference model 504, to predict the QoE metrics for different cohorts of users and compare these predictions to the user feedback 514 for those users, to evaluate the performance of reference model 504 for each of these cohorts.

Figure 6A:
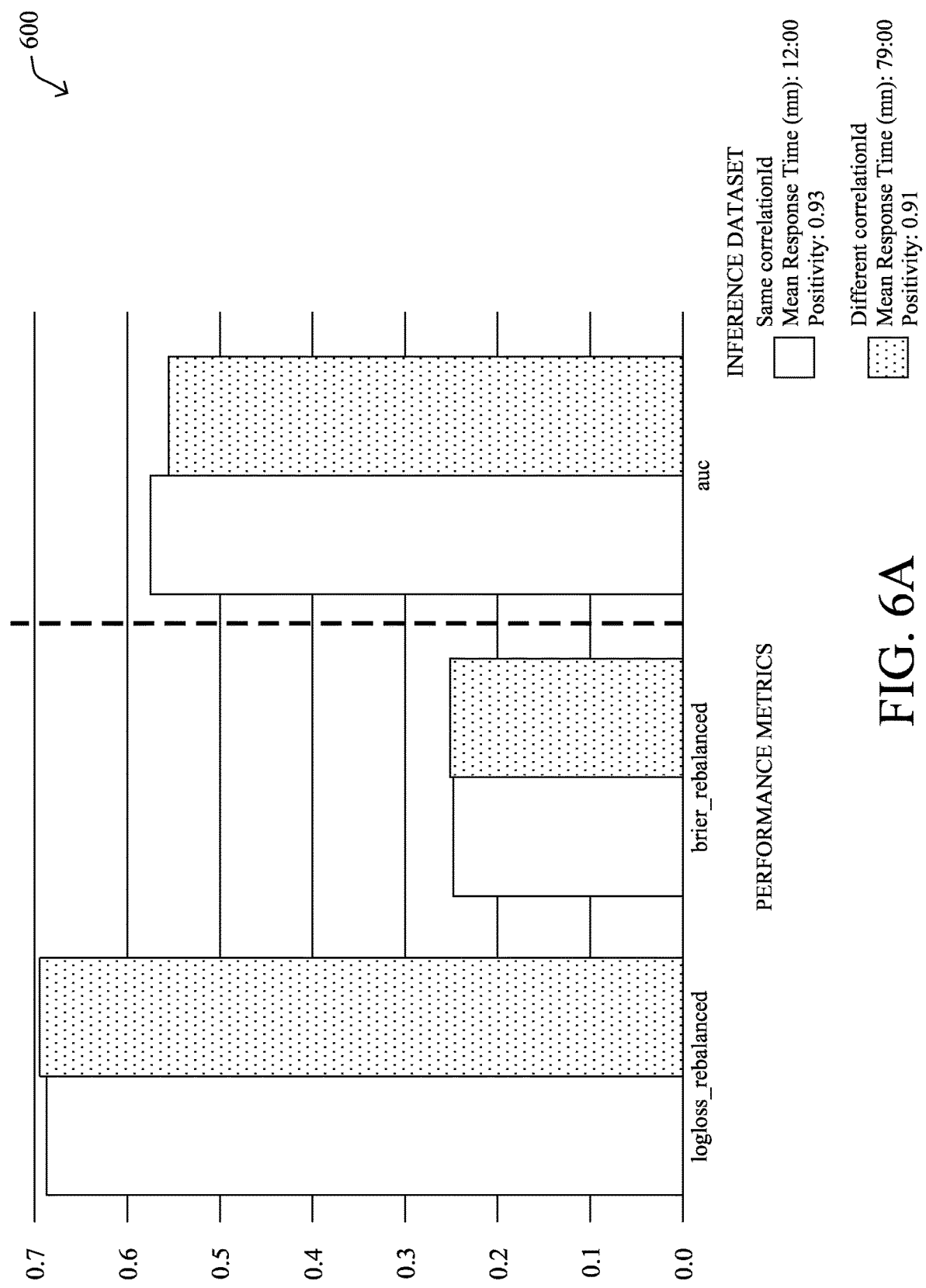
FIGS. 6A-6B illustrate examples plots of performance metrics for different cohorts of users.
Figure 6B:
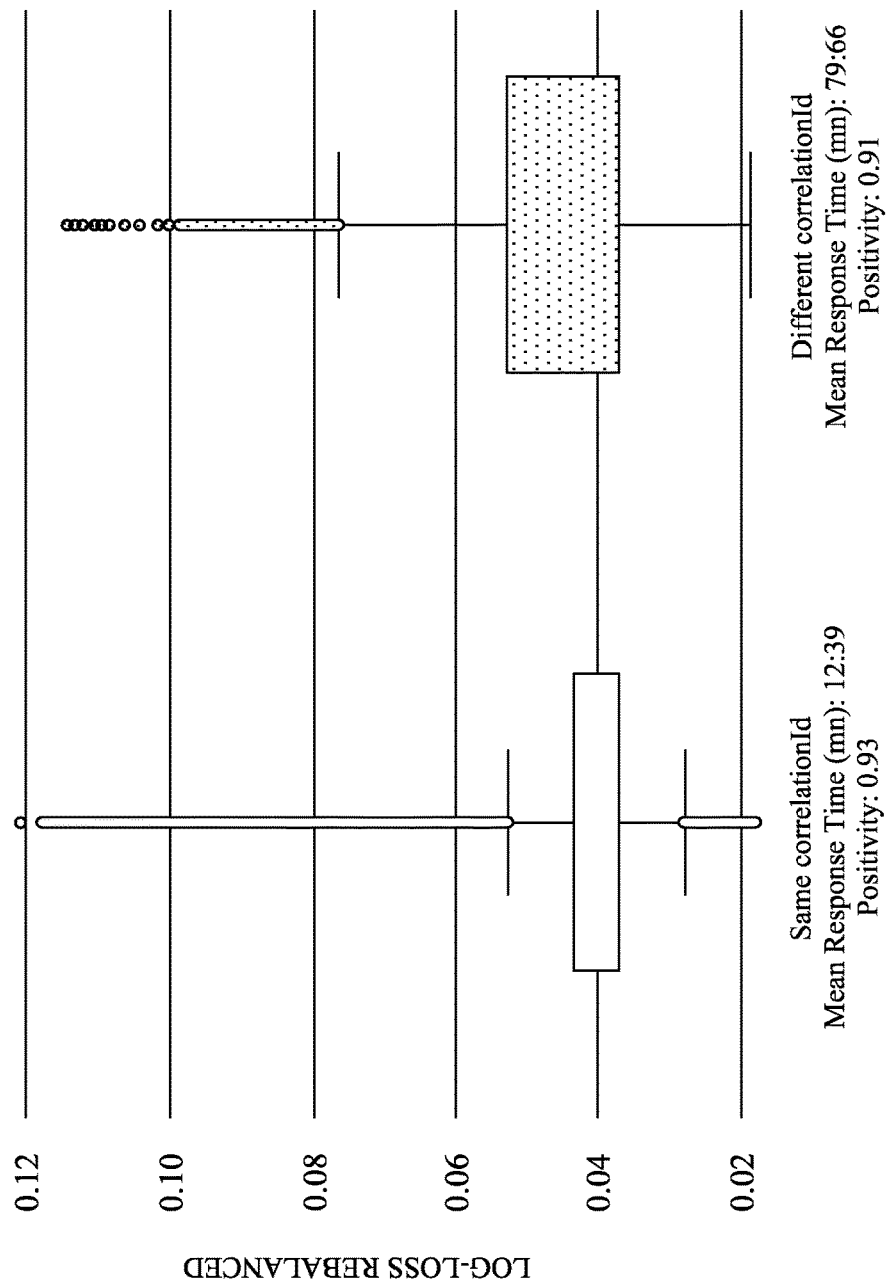

By way of example, FIGS. 6A-6B illustrate examples plots of performance metrics for different cohorts of users, in various embodiments. More specifically, FIG. 6A illustrates a plot of the performance metrics of reference model 504, such as rebalanced log loss, rebalanced Brier score, and area under curve (AUC) for two cohorts: a first cohort whose feedback was solicited by a chatbot during the same videoconference and a second feedback whose feedback was not. Cohort comparator 506 may compute these performance metrics by first using reference model 504 to predict the QoE for each of these cohorts and then comparing the predictions to the user feedback 514 actually provided by those users. Here, the first two metrics are expected to be as small as possible (the lower the values the better) while the AUC achieves better performance when it is closer to 1. The variety of metrics here ensures that all the behaviors of the QoE inference are captured.

From this example, the cohort of solicited feedback collected after the requested meeting materializes a lower performance than the other cohort across all the QoE prediction metrics. Cohort comparator 506 may also corroborate this conclusion by performing a statistical test between the two cohorts' respective QoE prediction errors.

FIG. 6B illustrates a plot 610 of the QoE prediction errors of reference model 504 over the two cohorts (e.g., their rebalanced log-loss), with the left representing the cohort of users from whom feedback was solicited after the meeting and the right representing the other cohort. The statistical test provided is a Kolmogorov-Smirnov 2-samples which compares the distribution of the inference errors for the two cohorts. The test outputs a p-value of $10^{-21}$, which is sufficient to conclude that the two populations are statistically different.

Referring again to FIG. 5, cohort decision analysis assistant 508 trigger cohort comparisons for meaningful cohort comparisons by cohort comparator 506 and report the results to user interface 518 for presentation to an administrator, in various embodiments. By way of example, assume that cohort A corresponds to a large group of users built over time by onboarding and adding more and more cohorts to the QoE modeling, while cohort B is a single candidate cohort (e.g., consisting of users in a specific location, business group, or with specific application interest and usage patterns). Thus, the goal here would be to validate cohort B, either in its difference with respect to Cohort A or in its similarity with previously collected samples from Cohort A. To avoid the integration of biases when constructing Cohort A, cohort decision analysis assistant 508 may provide indications to user interface 518 regarding the various statistical metrics regarding the users of the cohorts, their connectivity (e.g., remote vs. in-office, cellular vs. cable Internet vs. other access, etc.), the nature of their feedback, etc., to aid the administrator in selecting a cohort to be used for prediction model training.

Figure 7:
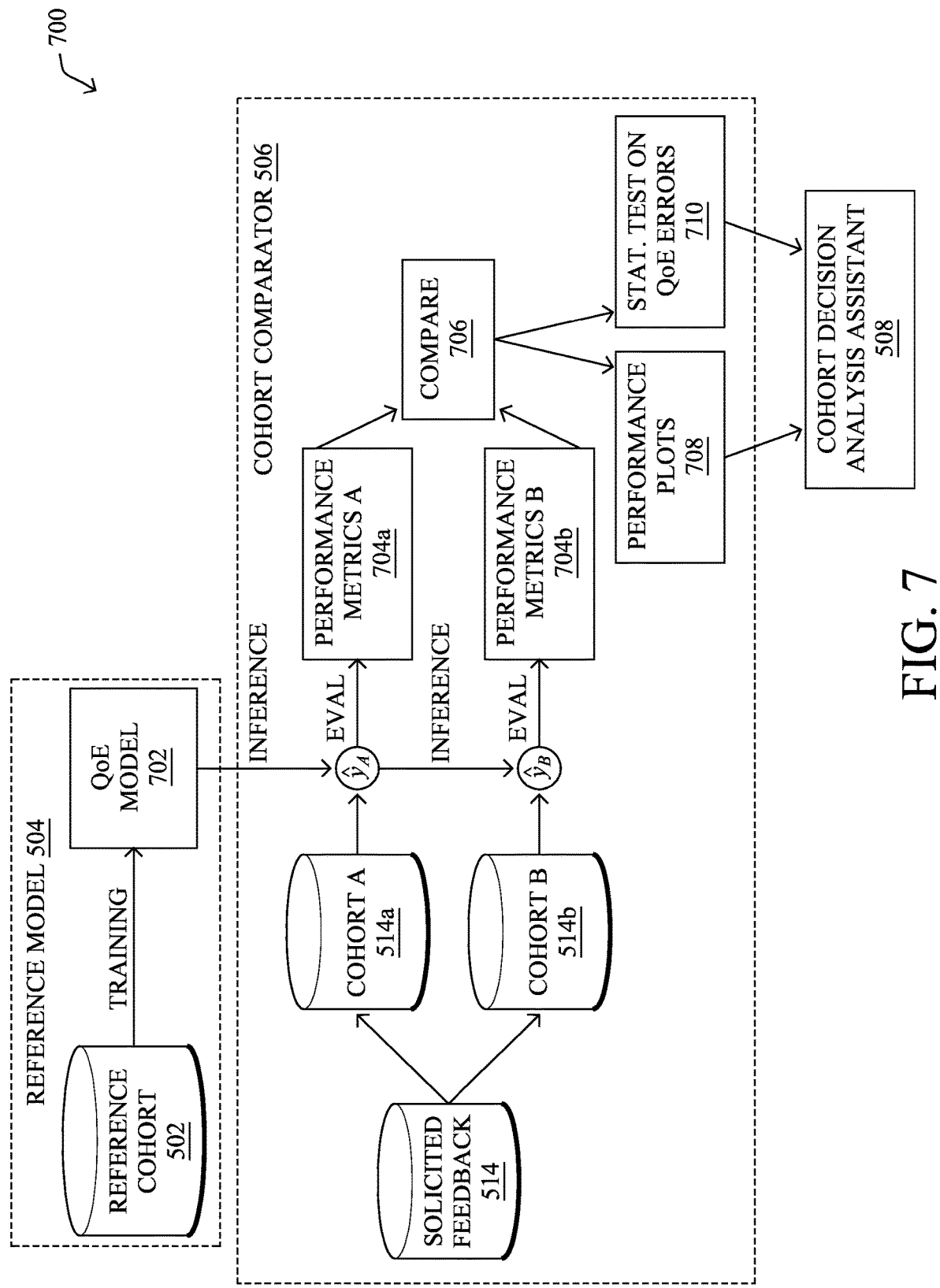
FIG. 7 illustrates an example diagram of the interactions of the components of the architecture of FIG. 5.

By way of example, FIG. 7 illustrates an example diagram of the interactions of components 502-508 of architecture 500 of FIG. 5, in various embodiments. As shown, QoE prediction model trainer 512 may initially train a QoE prediction model 702 (i.e., reference model 504) using the data associated with reference cohort 502. In turn, assume that application experience optimization process 248 obtains solicited feedback 514 from any number of users of the online application.

To evaluate different potential cohorts, cohort comparator 506 may split the solicited user feedback 514 into two feedback datasets 514a-514b for two different cohorts of users: Cohort A and Cohort B. In turn, cohort comparator 506 may use QoE prediction model 702 to predict the QoE for the users of each of these cohorts (e.g., based on their associated network telemetry 516) and compare these predictions to feedback datasets 514a-514b, to generate corresponding model performance metrics 704a-704b, respectively.

Cohort comparator 506 may then make one or more comparisons 706 between model performance metrics 704a-704b, to generate performance plots 708 and/or statistical test results 710 on the QoE errors. In turn, cohort comparator 506 may provide this information to cohort decision analysis assistant 508 for presentation to an administrator for review. Such an administrator may then select a particular cohort for inclusion in reference cohort 502 for purposes of model retraining.

Referring again to FIG. 5, dynamic cohort builder 510 may compute cohorts that could safely be constructed without the risk of introducing cohorts impacting the model performance, in various embodiments. Indeed, cohort could be static (cohort based on region where users providing labels reside, type of connectivity (e.g., ADSL connectivity working from home, etc.). The aim of dynamic cohort builder 510 is to automatically compute cohorts so that the addition of the corresponding labels does not decrease the performance of reference model 504. Note that some dynamically computed cohorts may also be shown to the user of the system via user interface 518, allowing them to determine whether the performance decrease is due to the fact that the users providing labels in this cohort experiment were subjected to different network characteristics/performance, in which case their labels should be used in model retraining, or whether the labels are simply less reliable (e.g., due to the subjectivities of those users).

Figure 8:
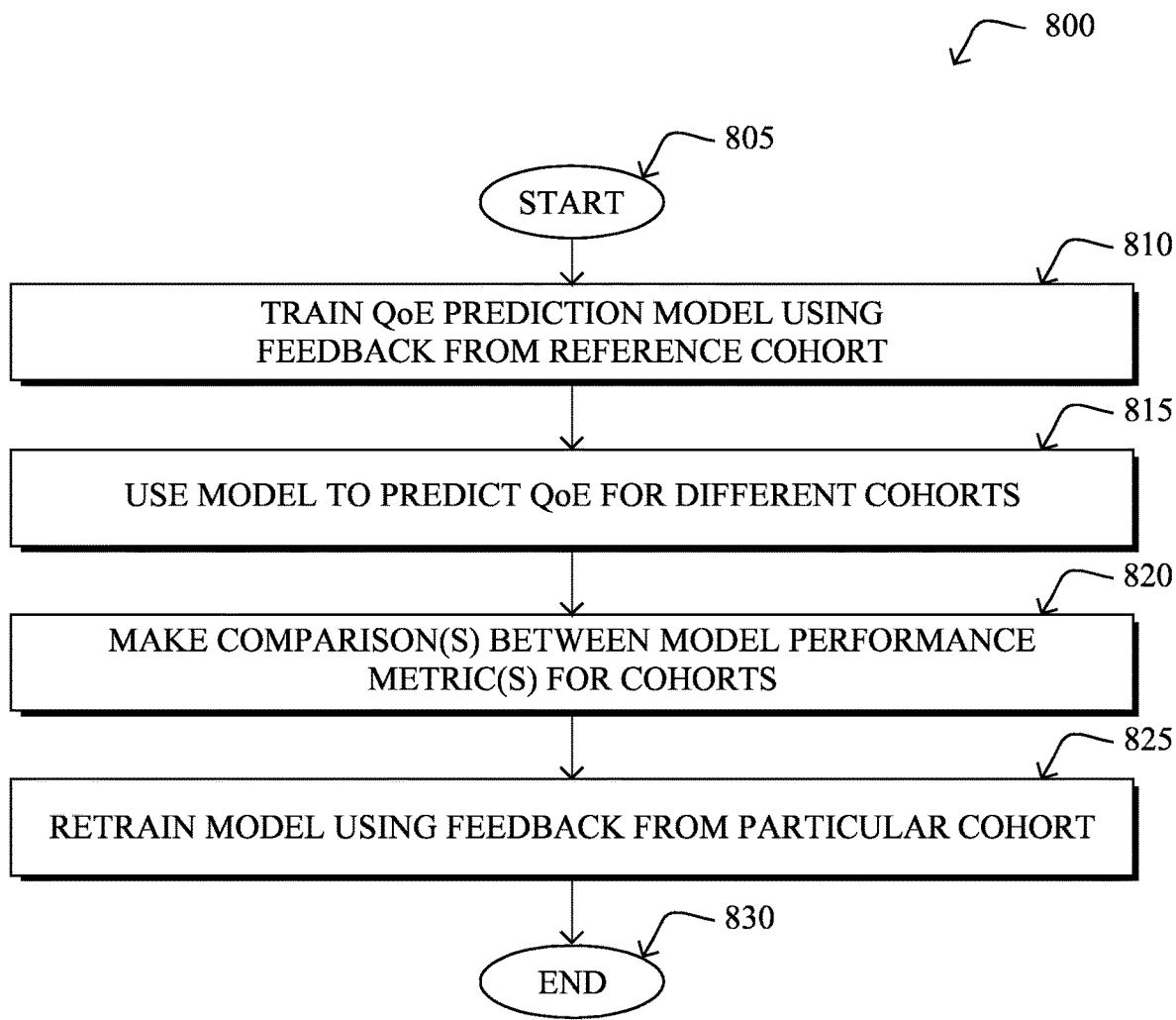
FIG. 8 illustrates an example simplified procedure for the robust training of application QoE prediction models.

FIG. 8 illustrates an example simplified procedure 800 (e.g., a method) procedure for the robust training of application QoE prediction models, in accordance with one or more embodiments described herein. For example, a nongeneric, specifically configured device (e.g., device 200), such as a router, firewall, controller for a network (e.g., an SDN controller or other device in communication therewith), or the like, may perform procedure 800 by executing stored instructions (e.g., application experience optimization process 248). The procedure 800 may start at step 805, and continues to step 810, where, as described in greater detail above, the device may train, using feedback from a reference cohort of users of an online application, a prediction model to predict a quality of experience metric for the online application based on network telemetry. In some embodiments, the feedback from the reference cohort of users comprises unsolicited feedback regarding their experiences with the online application.

At step 815, as detailed above, the device may use the prediction model to predict quality of experience metrics for different cohorts of users of the online application.

At step 820, the device may make one or more comparisons between performance metrics for the prediction model for the different cohorts of users, based on the quality of experience metrics predicted for the different cohorts of users, as described in greater detail above. In some embodiments, the device may also provide an indication of the one or more comparisons for presentation by a user interface and receive a selection of the particular cohort from the user interface. In another embodiment, the device may also provide an indication as to whether performance of the prediction model for the particular cohort is attributable to network conditions that affect those users in the particular cohort or attributable to their subjective opinions. In some embodiments, the device may compute the performance metrics for the prediction model for the different cohorts of users by comparing the quality of experience metrics predicted by the prediction model for those cohorts to feedback provided by those cohorts regarding their experiences with the online application.

At step 825, as detailed above, the device may retrain, based on the one or more comparisons, the prediction model using feedback from the reference cohort and a particular cohort from among the different cohorts of users. In some embodiments, the feedback from the particular cohort of users comprises solicited feedback regarding their experiences with the online application. In one embodiment, the feedback from the particular cohort of users is solicited via a chatbot. In further embodiments, the particular cohort of users use a same type of network connectivity to access the online application. In other embodiments, the particular cohort of users are located in a same geographic location. In additional embodiments, the particular cohort of users have similar usage patterns with the online application.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for the robust training of application QoE prediction models, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    training, by a device and using feedback from a reference cohort of users of an online application, a prediction model to predict a quality of experience metric for the online application based on network telemetry;
    using, by the device, the prediction model to predict quality of experience metrics for different cohorts of users of the online application;
    making, by the device, one or more comparisons between performance metrics for the prediction model for the different cohorts of users, based on the quality of experience metrics predicted for the different cohorts of users; and
    retraining, by the device and based on the one or more comparisons, the prediction model using feedback from the reference cohort and a particular cohort from among the different cohorts of users.

2. The method as in claim 1, wherein the feedback from the reference cohort of users comprises unsolicited feedback regarding their experiences with the online application.

3. The method as in claim 1, wherein the feedback from the particular cohort of users comprises solicited feedback regarding their experiences with the online application.

4. The method as in claim 3, wherein the feedback from the particular cohort of users is solicited via a chatbot.

5. The method as in claim 1, further comprising:
    providing, by the device, an indication of the one or more comparisons for presentation by a user interface; and
    receiving, at the device, a selection of the particular cohort from the user interface.

6. The method as in claim 5, further comprising:
    providing, by the device, an indication as to whether performance of the prediction model for the particular cohort is attributable to network conditions that affect those users in the particular cohort or attributable to their subjective opinions.

7. The method as in claim 1, wherein the particular cohort of users use a same type of network connectivity to access the online application.

8. The method as in claim 1, wherein the particular cohort of users are located in a same geographic location.

9. The method as in claim 1, further comprising:
    computing the performance metrics for the prediction model for the different cohorts of users by comparing the quality of experience metrics predicted by the prediction model for those cohorts to feedback provided by those cohorts regarding their experiences with the online application.

10. The method as in claim 1, wherein the particular cohort of users have similar usage patterns with the online application.

11. An apparatus, comprising:
one or more network interfaces;
a processor coupled to the one or more network interfaces and configured to execute one or more processes; and
a memory configured to store a process that is executable by the processor, the process when executed configured to:
train, using feedback from a reference cohort of users of an online application, a prediction model to predict a quality of experience metric for the online application based on network telemetry;
use the prediction model to predict quality of experience metrics for different cohorts of users of the online application;
make one or more comparisons between performance metrics for the prediction model for the different cohorts of users, based on the quality of experience metrics predicted for the different cohorts of users; and
retrain, based on the one or more comparisons, the prediction model using feedback from the reference cohort and a particular cohort from among the different cohorts of users.

12. The apparatus as in claim 11, wherein the feedback from the reference cohort of users comprises unsolicited feedback regarding their experiences with the online application.

13. The apparatus as in claim 11, wherein the feedback from the particular cohort of users comprises solicited feedback regarding their experiences with the online application.

14. The apparatus as in claim 13, wherein the feedback from the particular cohort of users is solicited via a chatbot.

15. The apparatus as in claim 11, wherein the process when executed is further configured to:
provide an indication of the one or more comparisons for presentation by a user interface; and
receive a selection of the particular cohort from the user interface.

16. The apparatus as in claim 15, wherein the process when executed is further configured to:
provide an indication as to whether performance of the prediction model for the particular cohort is attributable to network conditions that affect those users in the particular cohort or attributable to their subjective opinions.

17. The apparatus as in claim 11, wherein the particular cohort of users use a same type of network connectivity to access the online application.

18. The apparatus as in claim 11, wherein the particular cohort of users are located in a same geographic location.

19. The apparatus as in claim 11, wherein the process when executed is further configured to:
compute the performance metrics for the prediction model for the different cohorts of users by comparing the quality of experience metrics predicted by the prediction model for those cohorts to feedback provided by those cohorts regarding their experiences with the online application.

20. A tangible, non-transitory, computer-readable medium storing program instructions that cause a device to execute a process comprising:
training, by the device and using feedback from a reference cohort of users of an online application, a prediction model to predict a quality of experience metric for the online application based on network telemetry;
using, by the device, the prediction model to predict quality of experience metrics for different cohorts of users of the online application;
making, by the device, one or more comparisons between performance metrics for the prediction model for the different cohorts of users, based on the quality of experience metrics predicted for the different cohorts of users; and
retraining, by the device and based on the one or more comparisons, the prediction model using feedback from the reference cohort and a particular cohort from among the different cohorts of users.

* * * * *

UNITED STATES PATENT AND TRADEMARK OFFICE
CERTIFICATE OF CORRECTION

PATENT NO. : 11,979,298 B1
APPLICATION NO. : 18/209803
DATED : May 7, 2024
INVENTOR(S) : Grégory Mermoud et al.

It is certified that error appears in the above-identified patent and that said Letters Patent is hereby corrected as shown below:

In the Specification

Column 3, Line 38 please amend as shown:
2a.) Site Type B1: a site connected to the network using Column 8, Line 12 please amend as shown:
service point 406 may comprise routers 110*a*-110*b*.

Column 8, Line 57 please amend as shown:
thousands of Service Provides (SPs) and a number of SaaS Column 9, Line 33 please amend as shown:
QoE by sending HyperText Transfer Protocol (HTTP) probes Column 10, Line 36 please amend as shown:
options. At the same time, collaboration applications, which Column 11, Line 24 please amend as shown:
4. The Transport Layer— e.g., the layer at which TCP or Column 11, Line 28 please amend as shown:
6. The Presentation Layer— e.g., the layer that translates Column 11, Line 31 please amend as shown:
7. The Application Layer—e.g., the highest layer at which the Signed and Sealed this
Seventh Day of January, 2025

Derrick Brent
*Acting Director of the United States Patent and Trademark Office*